(12) United States Patent
Narayanan et al.

(10) Patent No.: US 9,141,162 B2
(45) Date of Patent: Sep. 22, 2015

(54) APPARATUS, SYSTEM AND METHOD FOR GATED POWER DELIVERY TO AN I/O INTERFACE

(71) Applicants: Rajagopal K. Narayanan, Bangalore (IN); Sampath Dakshinamurthy, Bangalore (IN); Sambaran Mitra, Barasat (IN); Devadatta V. Bodas, Federal Way, WA (US); Srikanth V. Nimmagadda, Bangalore (IN)

(72) Inventors: Rajagopal K. Narayanan, Bangalore (IN); Sampath Dakshinamurthy, Bangalore (IN); Sambaran Mitra, Barasat (IN); Devadatta V. Bodas, Federal Way, WA (US); Srikanth V. Nimmagadda, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 13/646,468

(22) Filed: Oct. 5, 2012

(65) Prior Publication Data

US 2014/0101468 A1 Apr. 10, 2014

(51) Int. Cl.
*G06F 1/32* (2006.01)
*G06F 1/26* (2006.01)

(52) U.S. Cl.
CPC .............. *G06F 1/266* (2013.01); *G06F 1/3287* (2013.01); *Y02B 60/1282* (2013.01)

(58) Field of Classification Search
None
See application file for complete search history.

(56) References Cited

U.S. PATENT DOCUMENTS

| | | | |
|---|---|---|---|
| 7,188,263 B1 * | 3/2007 | Rubinstein et al. | ........... 713/300 |
| 2005/0091629 A1 | 4/2005 | Eisenstadt et al. | |
| 2006/0055391 A1 | 3/2006 | Kuang et al. | |
| 2007/0046323 A1 | 3/2007 | Kuang et al. | |
| 2008/0005303 A1 * | 1/2008 | Rotithor et al. | ................ 709/223 |
| 2008/0082840 A1 * | 4/2008 | Kendall et al. | ................ 713/300 |
| 2009/0019243 A1 | 1/2009 | Hur et al. | |
| 2012/0204045 A1 | 8/2012 | Diab et al. | |

OTHER PUBLICATIONS

"PCT, International Search Report and Written Opinion of the International Searching Authority for International Application No. PCT/US2013/046402", (Nov. 8, 2013), Whole Document.
International Preliminary Report on Patentability from PCT/US2013/046402 mailed Apr. 16, 2015, 7 pgs.

* cited by examiner

*Primary Examiner* — Paul Yanchus, III
(74) *Attorney, Agent, or Firm* — Blakely, Sokoloff, Taylor & Zafman LLP

(57) ABSTRACT

Techniques and mechanisms for managing a delivery of power to a resource of an input/output (I/O) interface. In an embodiment, a first link of a plurality of communication links is monitored. Of the plurality of links, a first set of resources of the I/O interface is to support communication only via the first link. One or more other resources of the I/O interface are for supporting communications of another link of the plurality of links. In another embodiment, a resource of the first set of resources is decoupled from a power supply in response to detecting a total number of active lanes of the first link, decoupling.

26 Claims, 7 Drawing Sheets

APPARATUS, SYSTEM AND METHOD FOR GATED POWER DELIVERY TO AN I/O INTERFACE

BACKGROUND

1. Technical Field

One or more embodiments of the invention relate generally to the field of computer systems. More particularly, certain embodiments relate to power delivery in a computer system.

2. Background Art

Energy efficient performance is an increasingly important requirement for many computing applications. In servers and other computer platforms, operation of input/output (I/O) interface hardware is a significant contributor to overall power consumption. Performance analysis for various computer platforms has shown that the bandwidth of I/O links can be generally quite low even when such computer platforms are operating near peak system power load. Even when no transaction is processed over an I/O link of a platform, associated I/O interface resources consume close to their peak power. Power wastage during such low bandwidth utilization periods results in poor energy efficiency.

Power consumption by such I/O hardware has traditionally been reduced by scaling link speed and/or link width. Some link power reduction schemes use dynamic link width modulation (DLW), which adjusts link width dynamically based on bandwidth requirements, and gates a clock otherwise used to operate the currently inactive hardware for the link. Current I/O link power management (LPM) policies such as L0s, L0p, L1 rely on clock gating. However, as successive generations of computer systems continue to scale in terms of size and speed, the performance of such computer systems are increasingly sensitive to incremental improvements in energy efficiency.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide power gating mechanisms and techniques to selectively decouple from a power supply—and/or to selectively couple to a power supply—hardware resources of an I/O interface. Current clock gating techniques saves only dynamic power, but do not save leakage power, which is a major contributor to total power consumption of I/O interface hardware. The reliance on clock gating by current serial I/O link power management (LPM) policies, for example, does not address the issue of power inefficiency due to leakage power. By contrast, certain embodiments variously provide an ability to gate the power supply to inactive I/O interface hardware to save leakage as well as dynamic power. For example, such power gating may be selective of different hardware—e.g. on a per-link basis—to significantly improve power scaling with I/O bandwidth utilization.

Figure 1:
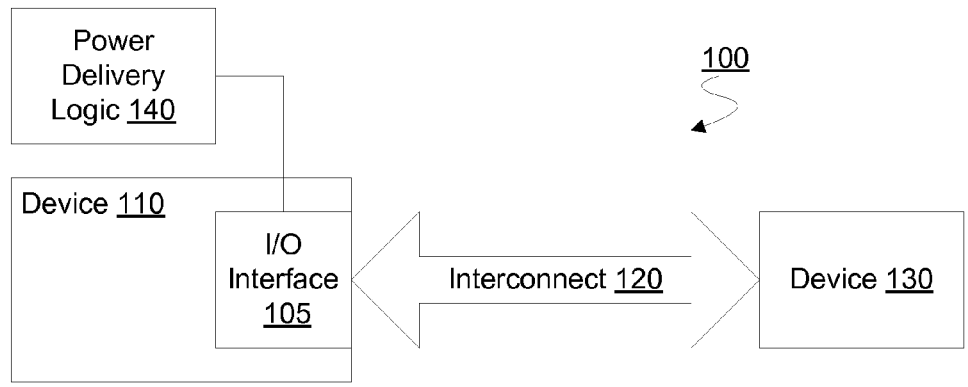
FIG. 1 is a block diagram illustrating element of a system for providing power gating of an I/O interface according to an embodiment.

FIG. 1 shows elements of an illustrative computer system 100 for providing power gating according to an embodiment. Computer system 100 may, for example, include a hardware platform of a personal computer such as a desktop computer, laptop computer, a handheld computer—e.g. a tablet, palmtop, smart phone, media player, and/or the like—and/or other such computer system. Alternatively or in addition, computer system 100 may provide for operation as a server, workstation, or other such computer system. In an embodiment, computer system 100 includes one or more mechanisms to control power delivery at a per-link level of granularity.

In an embodiment, computer system 100 includes a device 110 and a device 130 to communicate with one another via an interconnect 120. Device 110 and device 130 may each variously include any of a variety of devices capable of conducting input/output (I/O) communications—e.g. where such communications are according to a point-to-point serial I/O protocol. Examples of some types of devices capable of conducting I/O communications include a processor, a network controller, a storage controller, and various peripheral devices including, but not limited to, a computer mouse, keyboard, hard disk drive, solid state drive, CD-ROM drive, DVD-ROM drive, expansion card, graphics card, microphone, printer, display, speaker and/or the like. As used herein, "input/output" refers to communications to/from a device which includes the I/O interface in question. However, such communications may be between two components of a single computer platform, for example.

By way of illustration and not limitation, interconnect 120 may include a physical interconnect compatible with a serial I/O specification. For example, interconnect 120 may be compatible with a Peripheral Component Interconnect (PCI) specification such as the PCI Local Bus Specification, Revision 3.0, 2004, available from the PCI Special Interest Group, Portland, Oreg., U.S.A. (hereinafter referred to as a "PCI bus"), the PCI Express (PCIe) Specification, Revision 2.0, 2006, available from the aforementioned PCI Special Interest Group, Portland, Oreg., U.S.A., and/or the like. In such an embodiment, device 110 and device 130 be a processor and a peripheral device, respectively. In an alternate embodiment, device 110 and device 130 may each be processors—e.g. where interconnect 120 includes hardware to support QuickPath Interconnect (QPI) communications or other such interprocessor communications. In another embodiment, interconnect 120 is compatible with a Universal Serial Bus (USB) standard such as the USB 3.0 standard, released November 2008 by the USB 3.0 Promoter Group.

Interconnect 120 may be any of a variety of other types of interconnect hardware—including other serial interconnects and various parallel interconnects—which support one or more variable-width links. The term "link," is considered to include a channel, bus or other such a set of lanes which may operate together as a functional group. By way of illustration and not limitation, interconnect 120 may be a parallel bus coupled between a memory controller and a memory device—e.g. a dynamic random access memory (DRAM), Rambus DRAM (RDRAM) and/or the like. Alternatively, interconnect 120 may be one of an Inter-Integrated Circuit (I²C) bus, a Video Graphics Array (VGA) interconnect, a High-Definition Multimedia Interface interconnect In an embodiment, device 110 includes an I/O interface 105 to support communications via interconnect 120. I/O interface 105 may include various resources—e.g. including circuitry or other hardware—which implement, at least in part, respective operations for exchanging communications with interconnect 120. Computer system 100 may include power delivery logic 140—e.g. including hardware, firmware and/or executing software—to variously gate the delivery of power to such resources of I/O interface 105. Gating the delivery of power to such resources of I/O interface 105 may include, for example, independently coupling resources each to, and/or independently decoupling such resource each from, one or more respective power supplies (not shown). Such power coupling/decoupling may be performed with per-link granularity, including independent power coupling/decoupling for resources which are each specific to a different respective serial communication link. Some or all of power delivery logic 140 may be incorporated into device 110, in an alternate embodiment. Additionally or alternatively, power delivery logic 140 may provide power gating for device 130, although certain embodiments are not limited in this regard.

Certain features of various embodiments are discussed herein with reference to selective gating of power delivery to resources of a serial I/O interface. However, such discussion may be extended to additionally or alternatively apply to gating of power delivery to resources of any of a variety of types of parallel I/O interface.

Figure 2:
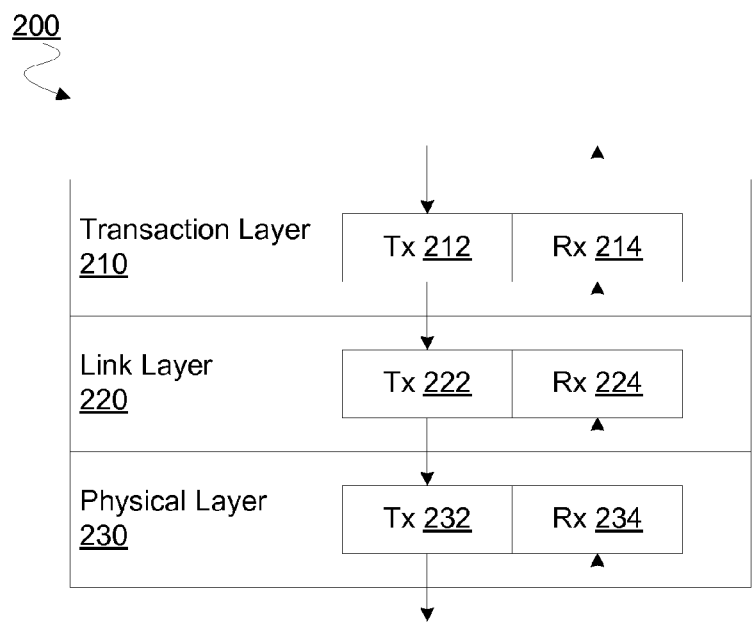
FIG. 2 is a block diagram illustrating elements of a protocol stack of an I/O interface for which power gating is provided according to an embodiment.

FIG. 2 illustrates elements of a protocol stack 200 of a serial I/O interface for which power gating may be provided according to an embodiment. The serial I/O interface may operate in a system including some or all of the features of computer system 100, for example. In an embodiment, protocol stack 200 is implemented in an interface which provides some or all of the functionality of I/O interface 105.

Protocol stack 200 may implement, at least in part, communications via a serial interconnect—e.g. where such communications are compatible with a PCIe or other serial point-to-point communication standard. Protocol stack 200 may include any of a variety of layered communication stacks, such as a common standard interface (CSI) stack, PCIe stack, or other such protocol stack. By way of illustration and not limitation, protocol stack 200 may be a PCIe protocol stack including transaction layer 210, link layer 220, and physical layer 230. Certain features of a serial I/O interface are discussed herein in reference to a specific embodiment of a PCIe protocol stack. However, such discussion may be extended to additionally or alternatively apply to any of a variety of other layered protocol stacks of a serial I/O interface.

In one embodiment, transaction layer 210 is to provide an interface between a device's processing logic and the interconnect architecture, such as that of data link layer 220 and physical layer 230. In this regard, responsibilities of the transaction layer 210 may include, for example, assembly and/or disassembly of packets (i.e., transaction layer packets, or TLPs). Transaction layer 210 may additionally or alternatively implement other functionality including, but not limited to, split transactions, credit-based flow control and/or the like.

Link layer 220, also referred to as data link layer 220, may act as an intermediate stage between transaction layer 210 and the physical layer 230. In one embodiment, link layer 220 provides one or more mechanisms for exchanging Transaction Layer Packets (TLPs) between components of a link. For example, link layer 210 may accept TLPs assembled by transaction layer 210, apply a packet sequence identifier, calculate and apply an error detection code, and/or submit the modified TLPs to physical layer 230 for transmission to another device. Physical layer 230 may include logic to physically transmit a packet to an external device. For example, physical layer 230 may include transmit logic section to prepare outgoing information for transmission, and receiver logic to identify and prepare received information before passing it to link layer 220.

In an embodiment, the layers of protocol stack 200 each include respective hardware resources to variously implement functionality of that layer. By way of illustration and not limitation, transaction layer 210 may include a set of transmit resources 212 to assemble packets for transmission from the device which includes the serial I/O interface, and a set of receive resources 214 to disassemble packets which have been received by such a device. Similarly, link layer 220 and physical layer 230 may include, respectively, a set of transmit resources 222 and a set of transmit resources 232 each to variously prepare for transmission packets assembled by the set of transmit resources 212. Alternatively or in addition, link layer 220 and physical layer 230 may include, respectively, a set of receive resources 224 and a set of receive resources 234 each to variously prepare received packets for disassembly by the set of receive resources 214.

Protocol stack 200 may support a plurality of links—e.g. serial point-to-point links—which, at a given time, each comprise one or more respective lanes. Each lane may include a serial channel that can be implemented as, for example, a differential signal line, a single-ended signal line or a fiber optic channel. A link may, for example, be a uni-directional point-to-point link, where either each lane of the link is for transmitting data from a device, or each lane of the link is for receiving data sent to that device. Alternatively, a link may be bidirectional—e.g. where one or more lanes of the link variously transmit data from a device, and one or more other lanes of the link variously receive data sent to that device. The plurality of links supported by protocol stack 200 may include at least one link which, at different times, can have a different total number of lanes which are currently active in implementing respective communications. For brevity, such a link is referred to herein as a "variable width" link, where "width" is understood to refer to such a total number of currently active lanes of the link.

Of the plurality of links supported by protocol stack 200, certain resources of the protocol stack 200 may operate to support only one such link. For example, one or more of the sets of resources 212, 214, 222, 224, 232, 234 may facilitate communication via a first link of the plurality of links, where such one or more sets of resources are not for facilitating communication of any other of the plurality of links. In such an embodiment, at least in the context of the plurality of links, such one or more sets of resources may be said to be specific to, or dedicated to, that first link. Such resources may be link-specific due at least in part to hardwired circuitry of the serial I/O interface, although certain embodiments are not limited in this regard.

Figure 3:
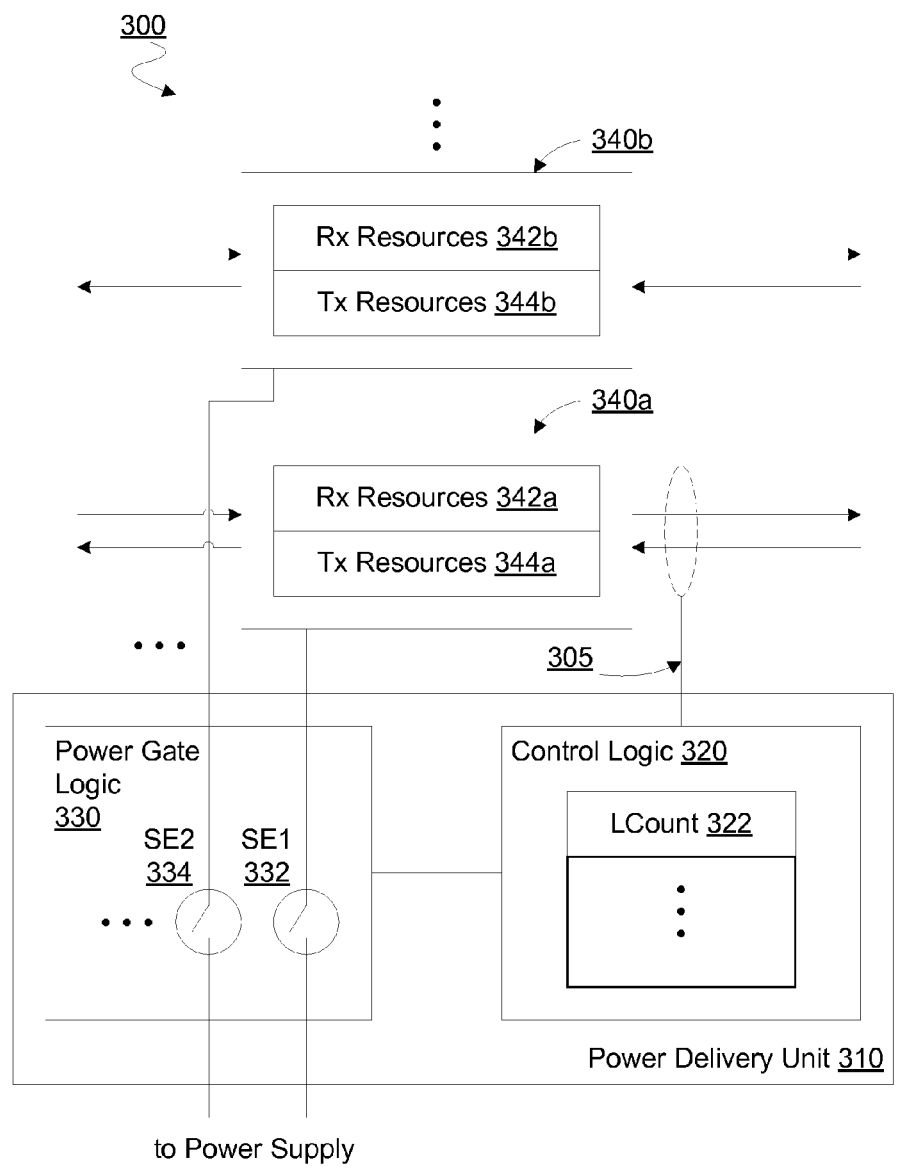
FIG. 3 is a block diagram illustrating elements of a system for providing power gating according to an embodiment.

FIG. 3 illustrates elements of a system 300 for providing power gating according to an embodiment. System 300 may include some or all of the features of system 100, for example. In an embodiment, system 100 comprises a processor, peripheral or other device (such as device 100) including a serial I/O interface, where the device couples to or incorporates logic which provides some or all of the functionality of power delivery logic 140.

System 300 may include power delivery unit 310 comprising logic—e.g. including hardware, firmware and/or executing software—to selectively gate delivery of power to various resources of the serial I/O interface of system 300. Power delivery unit 310 may include some or all of the features of power delivery logic 140. In an embodiment, power delivery unit 310 is variously coupled to different resources of a serial I/O interface (for brevity, also referred to herein as "interface resources" or simply "resources"). The interface resources may variously support a plurality of communication links—e.g. serial point-to-point links—which, at a given time, each comprise one or more respective lanes.

By way of illustration and not limitation, power delivery unit 310 may couple to resource set 340a—e.g. where resource set 340a includes one or more receive resources 342a and/or one or more transmit resources 344a. Alternatively or in addition, resource set 340a may include one or more resources which are used both for transmitting data and for receiving data. Resource set 340a may include any of a variety of additional or alternative resources, according to different embodiments. Of the plurality of links supported by the serial I/O interface of system 300, resource set 340a may support communication of only one particular link. For example, operation of resource set 340a may facilitate communication via a first link 305 of the plurality of links, where communication of any other of the plurality of links is implemented independent of resource set 340a.

Certain features of various embodiments are discussed herein in the context of a resource set which is specific to a bidirectional link—e.g. where resource set 340a includes one or more receive resources 342a for a bidirectional link to receive communications and one or more transmit resources 344a for that bidirectional link to transmit communications. However, such discussion may be extended to additionally or alternatively apply to a set of interface resources which is specific to a unidirectional link. For example, one or more receive resources 342a may be a set of resources which are specific to a unidirectional receive link and/or one or more receive resources 342b may be a set of resources which are specific to a unidirectional transmit link.

In an embodiment, the serial I/O interface of system 300—in addition to resource set 340a—includes other resources for supporting communication with the link or links of the plurality of links other than the first link 305. By way of illustration and not limitation, the serial I/O interface may include resource set 340b comprising one or more receive resources 342b and/or one or more transmit resources 344b. Resource set 340b may be specific to another link of the plurality of links, although certain embodiments are not limited in this regard. For example, operation of resource set 340b may facilitate communication via a second link—e.g. a second bidirectional link—of the plurality of links, where resource set 340b is not for facilitating communication of any other of the plurality of links.

Power delivery unit 310 may include control logic 320 to monitor a link, where, of the plurality of links of the serial I/O interface, a set of resources of the serial I/O interface are specific to that link. For example, control logic may monitor the bidirectional link 305 corresponding to the resource set 340a. Monitoring such a link 305 may include control logic 320 snooping one or more lanes of the link—e.g. to detect for each such lane a respective level of lane activity (or inactivity). Alternatively or in addition, control logic 320 may receive from the serial I/O interface a dedicated message which identifies activity (or inactivity) of one or more lanes. Any of a variety of conventional mechanisms for monitoring an I/O interface may be adapted for control logic 320 to monitor link 305, according to different embodiments.

In an embodiment, monitoring link 305 includes control logic 320 monitoring a count LCount 322 of a total number of active lanes of link 305. Activity (or inactivity) of a lane may be determined, for example, based on a rate of information exchange via the lane—e.g. based on a comparison of such a rate of information exchange to zero (0) or some other threshold value. In an embodiment, the monitored link 305 is a variable width link—e.g. where a value of LCount 322 identifies a current width of link 305. Control logic 320 may monitor a width of one or more additional or alternative links, according to different embodiments.

Based on the monitoring, control logic 320 may detect a change of LCount 322. In response to the detected change of LCount 322, power delivery unit 310 may change a state of power delivery to one or more resources of the serial I/O interface. For example, power delivery unit 310 may further include power gate logic 330 coupled between resources set 340a and one or more power supplies. Power gate logic 330 may include logic to selectively couple interface resources to a power supply and/or to selectively decouple such interface resources from a power supply—e.g. where such resources may be selectively coupled/decoupled independent of one another. By way of illustration and not limitation, power gate logic 330 may include switch logic—e.g. including illustrative switch elements SE1 332, SE2 334—each coupled between a power supply and a respective interface resource (or set of interface resources). SE1 332 may selectively provide power coupling/decoupling only for one or more resources of resource set 340a, for example. Alternatively or in addition, SE2 334 may selectively provide power supply coupling/decoupling only for one or more resources of resource set 340b.

One or more switch elements of power gate logic 330—e.g. SE1 332 and SE2 334—may operate independent of one another. By way of illustration and not limitation, SE1 332 may decouple one or more receive resources 342a, and/or one or more transmit resources 344a, from a power supply—e.g. in response to LCount 322 changing to zero or to some other threshold value (or, in an embodiment, to below a threshold value). Such decoupling of one or more resources of resource set 340a may take place while a state of power coupling (e.g. coupled or decoupled) with SE2 334 remains unchanged.

Alternatively or in addition, such decoupling of one or more resources of resource set 340a may take place while a state of power coupling for one or more other resources of resource set 340a remains the same. For example, SE1 332 may selectively provide power to only a subset of the resources in resource set 340a—e.g. where one or more other resources of resource set 340a are provided with power independent of SE1 332. In an embodiment, power gate logic 330 includes one or more other switch elements (not shown) to provide selective power coupling/decoupling for such other resources of resource set 340a independent of the selective power coupling/decoupling by SE1 332.

Certain features of various embodiments are discussed herein with respect to selectively coupling different interface resources to the same power supply and/or selectively decoupling different interface resources from the same power supply. However, such discussion may be extended to additionally or alternatively apply to selectively coupling interface resources each to a different respective power supply and/or selectively decoupling interface resources each from a different respective power supply.

Figure 4:
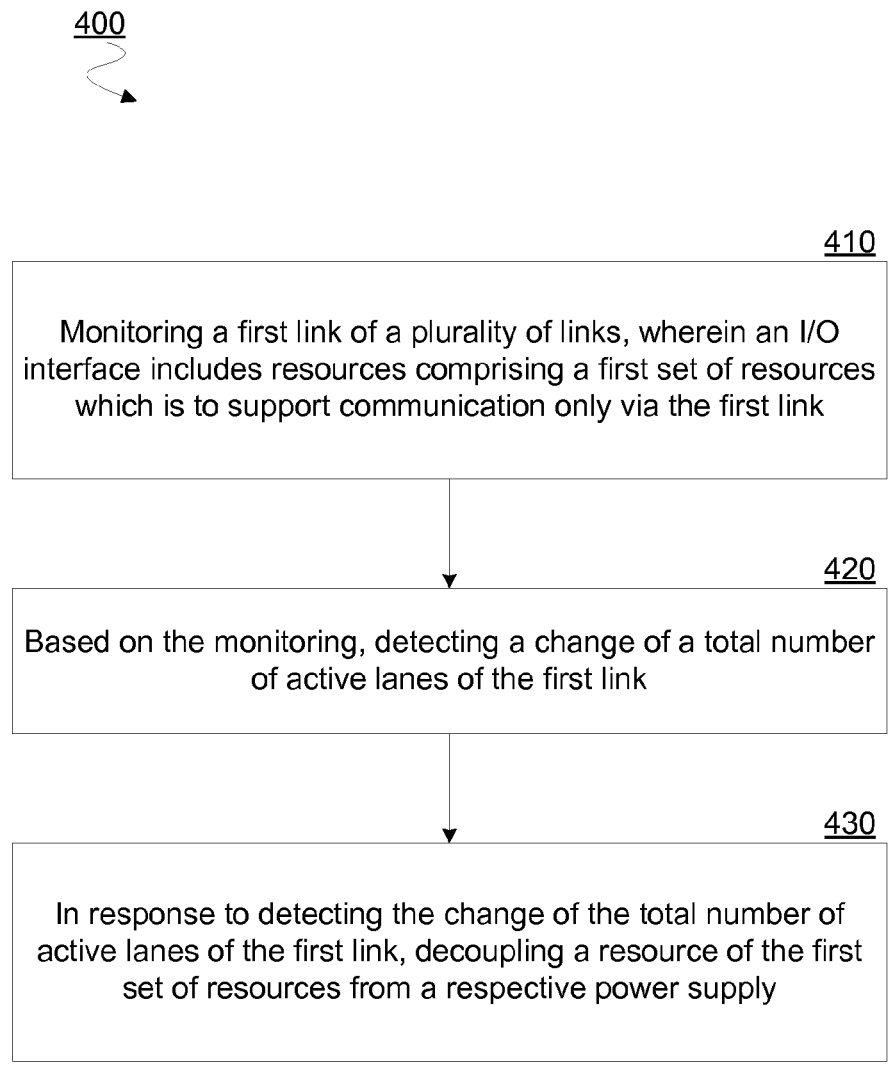
FIG. 4 is a flow diagram illustrating elements of a method for gating power for an I/O interface according to an embodiment.

FIG. 4 illustrates elements of a method 400 for providing power gating for an I/O interface according to an embodiment. Method 400 may gate delivery of power to an interface such as I/O interface 105. In an embodiment, method 400 is performed by logic having some or all of the functionality of power delivery unit 310.

Method 400 may include, at 410, monitoring a first link of a plurality of links, where an I/O interface includes resources comprising a first set of resources which is to support communication only via the first link. The I/O interface may be configured to couple to an interconnect which, for example, is compatible with a PCI interconnect standard. In an embodiment, the I/O interface resides on a first processor, where the interconnect is for communication between the first processor and a second processor. In an embodiment, the first set of resources includes resources of a physical layer of a protocol stack. Alternatively or in addition, the first set of resources may include resources of a link layer and/or resources of a transaction layer in such a protocol stack.

Method 400 may further include, at 420, detecting, based on the monitoring, a change of a total number of active lanes of the first link. Detecting the change at 420 may include, for example, detecting communications via the interconnect to negotiate a width change for the first link. Alternatively or in addition, detecting the change at 420 may include detecting a transition to an idle (e.g. L1) or other low power state by another device which is a target of I/O communication.

In response to detecting the change of the total number of active lanes of the first link, method 400 may, at 430, decouple a resource of the first set of resources from a respective power supply. The power decoupling at 430 may, for example, be in response to detecting that no lanes of the first link are active. In an embodiment, the power decoupling at 430 is independent of any power decoupling for another interface resource. For example, the power decoupling at 430 may be independent of any decoupling of a resource of a second set of resources from a respective power supply, where the second set of resources is specific to a second link of the plurality of links. Alternatively or in addition, the decoupling at 430 may be independent of any power decoupling of another resource of the first set of resources. In an embodiment, the monitoring at 410 resumes, or continues, after the decoupling at 430 and while other resources of the first set of resources remain powered. Such other resources of the first set of resources may, for example, maintain state information for the first link.

In an embodiment, method 400 further comprises one or more operations (not shown) to couple—e.g. to recouple—one or more interface resources to a power supply. For example, the monitoring at 410 may resume or continue after the decoupling at 430 where, based on the additional monitoring, another change of the total number of active lanes is detected. In response to detecting the other change of the total number of active lanes, the resource previously decoupled from power at 430 may again be coupled to the respective power supply. Such coupling may, for example, be in response to detecting an indication of activity of at least one lane of the first link.

Certain embodiments independently decouple one or more interface resources of a layer in a protocol stack, where such one or more resources are specific to a particular link of a plurality of links. Such one or more resources may, for example, be distinguished from conventional interface resources at least insofar as the one or more resources reside in a power domain which is specific to hardware for that particular link. However, such one or more resources may implement some functionality of the protocol stack layer with otherwise conventional techniques and/or mechanisms.

By way of illustration and not limitation, physical layer resources to be independently power coupled and/or decoupled may include scrambler circuitry for providing data scrambling and/or descrambling functionality—e.g. including per-lane and/or link wide scrambling/descrambling. Alternatively or in addition, such physical layer resources may one or more of pre-emphasis logic for overdriving a portion of a data transmission, byte locking circuitry for identifying a reference point in a frame of data, a clock compensation FIFO to accommodate communication operations which span different clock domains, de-skewing buffer and/or control logic, a frequency compensation buffer, 8b/10b encoder (or decoder) logic and/or any of a variety of other such logic for implementing physical layer functionality. Examples of resources of a link layer which may be independently decoupled from a power supply include, for example, logic to fragment a packet for transmission through a link, logic to defragment a packet received for via a link, error detection and/or error correction logic such as cyclic redundancy check (CRC) generation/checking circuitry and/or any of a variety of other such logic for implementing link layer functionality. Any of a variety of additional or alternative resources of physical, link and/or other layers of a protocol stack may be independently power coupled/decoupled, according to different embodiments.

For example, in an illustrative embodiment, power gate logic 330 responds to inactivity of any lanes in a link by performing power decoupling for one or more resources specific to that link, but without performing power decoupling for another resource specific to that link. In an embodiment, the other resource preserves state information for the link. By way of illustration and not limitation, the other resource includes one or more physical layer resources such as control registers, status registers, a Link Training State and Status Machine (LTSSM) and/or other such resources which maintain state of the link. Alternatively, the other resource may include one or various link layer resources such as a link layer control register, status register, a retry state machine and/or the like.

Figure 5:
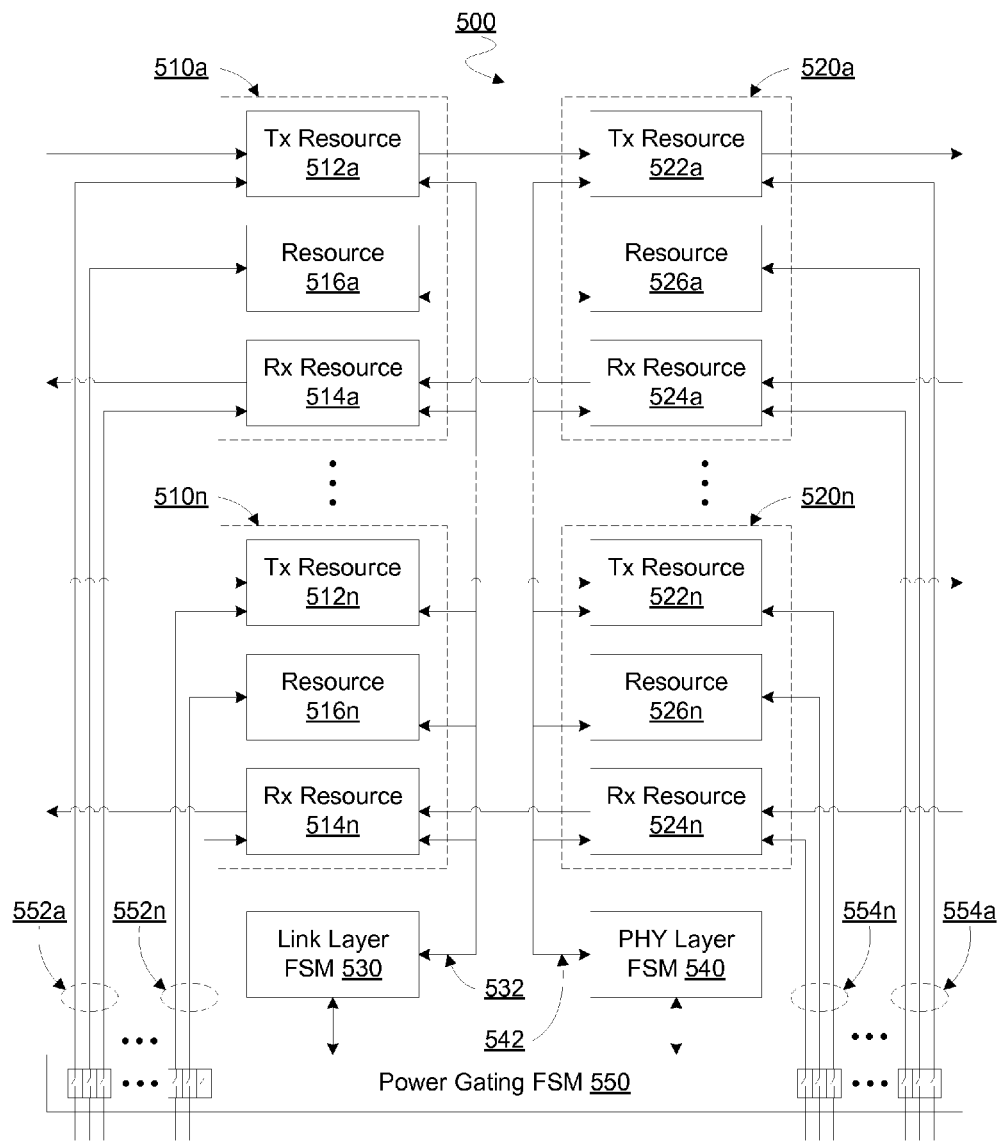
FIG. 5 is a block diagram illustrating elements of a system for providing power gating according to an embodiment.

FIG. 5 illustrates elements of a system 500 for providing power gating according to an embodiment. System 500 may include some or all of the features of system 300, for example. In an embodiment, system 500 comprises a processor, peripheral or other device (such as device 100) including a serial I/O interface, where the device couples to or incorporates logic which provides some or all of the functionality power delivery unit 310.

In an embodiment, the serial I/O interface of system 500 includes resources for supporting communication with a plurality of links including one or more variable width links. Supporting such communication may include the serial I/O interface implementing a layered protocol stack. By way of illustration and not limitation, the serial I/O interface may implement a link layer of a protocol stack—e.g. with a link layer resource set 510a specific to a first link and a link layer resource set 510n for a second link other than the first link. Alternatively or in addition, the serial I/O interface may implement a physical layer of such a protocol stack—e.g. with a physical layer resource set 520a specific to the first link and a physical layer resource set 520n for the second link other than the first link.

In an embodiment, link layer resource set 510a includes one or more of a transmit resource 512a for data transmission, a receive resource 514a for data reception and, in an embodiment, another resource 516a for data transmission, data reception, or both. Similarly, link layer resource set 510n may include one or more of a transmit resource 512n, a receive resource 514n and, in an embodiment, another resource 516a for data transmission, data reception, or both. Alternatively, physical layer resource set 520a may include one or more of a transmit resource 522a for data transmission, a receive resource 524a for data reception and, in an embodiment, another resource 526a for data transmission, data reception, or both. Similarly, physical layer resource set 520n may include one or more of a transmit resource 522n, a receive resource 524n and, in an embodiment, another resource 516a for data transmission, data reception, or both.

Implementation of the protocol stack may include operation of a link layer finite state machine (FSM) 530 of system 500—or other such logic—to variously provide control signals 532 each for respective operations of link layer resource set 510a and/or link layer resource set 510n. Alternatively or in addition, system 500 may include a physical layer FSM 540 or other such logic to variously provide control signals 542 each for respective operations of physical layer resource set 520a and/or physical layer resource set 520n. Some or all of control signaling 532, 542 may be according to conventional techniques for operating a protocol stack, and may not be limiting on certain embodiments.

System 500 may include circuitry to gate delivery of power to resources of the serial I/O interface. For example, system 500 may include power gating FSM 550, or other such logic, to selectively control the coupling of various interface resources each to a respective power supply. Power gating FSM 550 may include some or all of the features of power delivery unit 310, for example. In an embodiment, power gating FSM 550 performs method 400.

Power gating FSM 550 may receive one or more signals from link layer FSM 530 and/or physical layer FSM 540 for monitoring a link of the plurality of links supported by interface resources of system 500. By way of illustration and not limitation, power gating FSM 550 may monitor a first link which is supported by link layer resource set 510a and/or physical layer resource set 520a, where—of the plurality of links—link layer resource set 510a and/or physical layer resource set 520a support communication of only that first link. In an embodiment, power gating FSM 550 may further monitor a second link which is supported by link layer resource set 510n and/or physical layer resource set 520n, where—of the plurality of links—link layer resource set 510n and/or physical layer resource set 520n support communication of only that second link.

Based on the monitoring, power gating FSM 550 may detect a change of a width of the first link. In response to such a change of the first link, power gating FSM 550 may implement a set of power saving operations for the change in the width of the first link. By way of illustration and not limitation, in response to the first link having no active lanes, power gating FSM 550 may variously decouple one or more of a set of power lines 552a each from a respective power supply—e.g. the same power supply. The set of power lines 552a may variously power different respective ones of transmit resource 512a, receive resource 514a and resource 516a. Alternatively or in addition, power gating FSM 550 may variously decouple one or more of a set of power lines 554a each from a respective power supply—e.g. the same power supply. The set of power lines 552a may variously power different respective ones of transmit resource 522a, receive resource 524a and resource 526a.

In an embodiment, power gating FSM 550 may further detect—e.g. based on the monitoring with link layer FSM 530 and/or physical layer FSM—a change of a width of the second link. In response to such a change of the second link, power gating FSM 550 may implement a set of power saving operations for the change in the width of the second link. By way of illustration and not limitation, in response to the second link having no active lanes, power gating FSM 550 may variously decouple one or more of a set of power lines 552n each from a respective power supply—e.g. the same power supply. The set of power lines 552n may variously power different respective ones of transmit resource 512n, receive resource 514n and resource 516n. Alternatively or in addition, power gating FSM 550 may variously decouple one or more of a set of power lines 554n each from a respective power supply—e.g. the same power supply. The set of power lines 552n may variously power different respective ones of transmit resource 522n, receive resource 524n and resource 526n.

Selective power coupling/decoupling of a resource of link layer resource set 510a and physical layer resource set 520a may be independent of selective power coupling/decoupling of another resource of link layer resource set 510a and physical layer resource set 520a. Alternatively or in addition, selective power coupling/decoupling of a resource of link layer resource set 510a and physical layer resource set 520a may be independent of selective power coupling/decoupling of a resource of link layer resource set 510n and physical layer resource set 520n.

Figure 6:
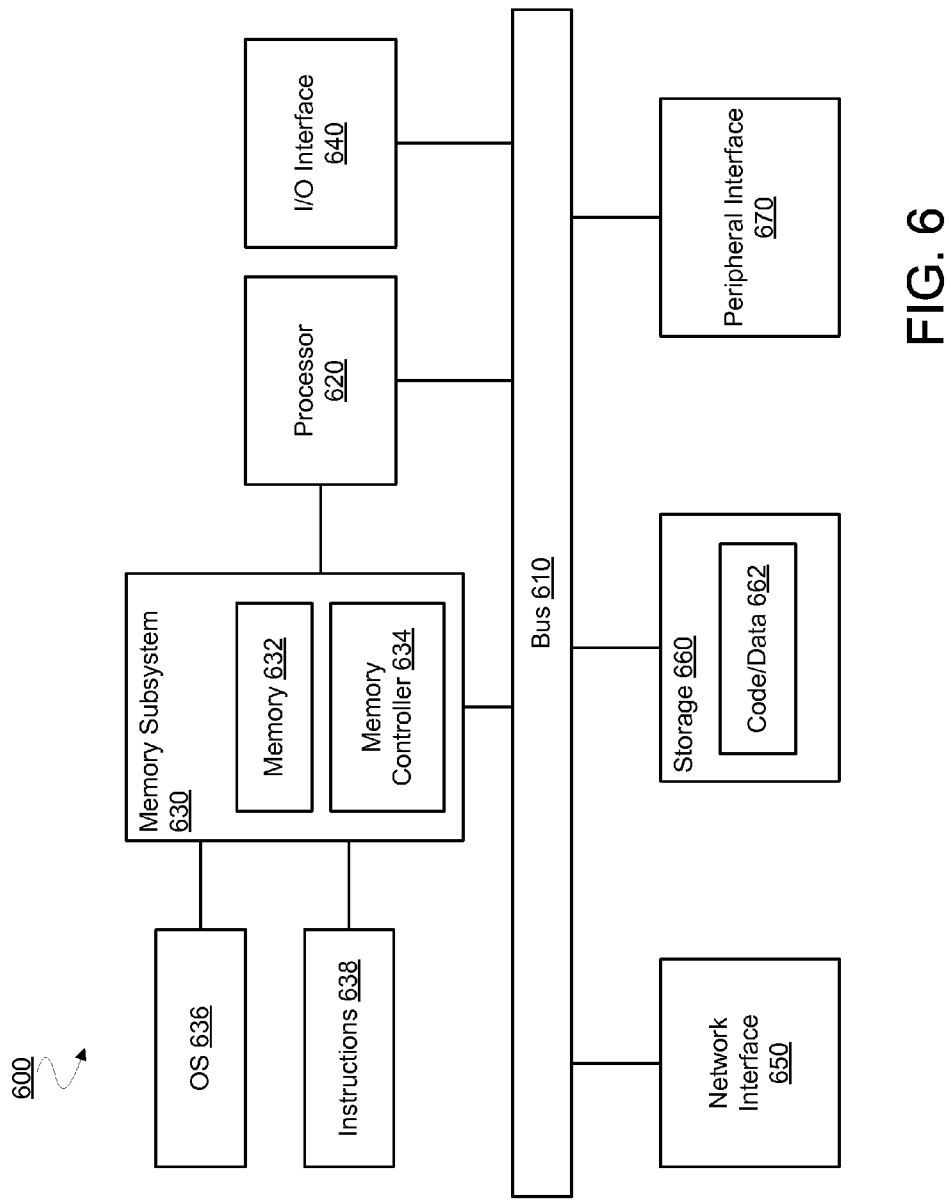
FIG. 6 is a block diagram illustrating elements of a computing system for gating power for an I/O interface according to an embodiment.

FIG. 6 is a block diagram of an embodiment of a computing system in which power gating may be implemented. System 600 represents a computing device in accordance with any embodiment described herein, and may be a laptop computer, a desktop computer, a server, a gaming or entertainment control system, a scanner, copier, printer, or other electronic device. System 600 may include processor 620, which provides processing, operation management, and execution of instructions for system 600. Processor 620 may include any type of microprocessor, central processing unit (CPU), processing core, or other processing hardware to provide processing for system 600. Processor 620 controls the overall operation of system 600, and may be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 630 represents the main memory of system 600, and provides temporary storage for code to be executed by processor 620, or data values to be used in executing a routine. Memory subsystem 630 may include one or more memory devices such as read-only memory (ROM), flash memory, one or more varieties of random access memory (RAM), or other memory devices, or a combination of such devices. Memory subsystem 630 stores and hosts, among other things, operating system (OS) 636 to provide a software platform for execution of instructions in system 600. Additionally, other instructions 638 are stored and executed from memory subsystem 630 to provide the logic and the processing of system 600. OS 636 and instructions 638 are executed by processor 620.

Memory subsystem 630 may include memory device 632 where it stores data, instructions, programs, or other items. In one embodiment, memory subsystem includes memory controller 634, which is a memory controller in accordance with any embodiment described herein, and which provides power delivery mechanisms. In one embodiment, memory controller 634 provides commands to memory device 632. The commands may be for memory device 632 to provide memory device 632 with access to data.

Processor 620 and memory subsystem 630 are coupled to bus/bus system 610. Bus 610 is an abstraction that represents any one or more separate physical buses, communication lines/interfaces, and/or point-to-point connections, connected by appropriate bridges, adapters, and/or controllers. Therefore, bus 610 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 610 may also correspond to interfaces in network interface 650.

System 600 may also include one or more input/output (I/O) interface(s) 640, network interface 650, one or more internal mass storage device(s) 660, and peripheral interface 670 coupled to bus 610. I/O interface 640 may include one or more interface components through which a user interacts with system 600 (e.g., video, audio, and/or alphanumeric interfacing). Network interface 650 provides system 600 the ability to communicate with remote devices (e.g., servers, other computing devices) over one or more networks. Network interface 650 may include an Ethernet adapter, wireless interconnection components, USB (universal serial bus), or other wired or wireless standards-based or proprietary interfaces.

Storage 660 may be or include any conventional medium for storing large amounts of data in a nonvolatile manner, such as one or more magnetic, solid state, or optical based disks, or a combination. Storage 660 holds code or instructions and data 662 in a persistent state (i.e., the value is retained despite interruption of power to system 600). Storage 660 may be generically considered to be a "memory," although memory 630 is the executing or operating memory to provide instructions to processor 620. Whereas storage 660 is nonvolatile, memory 630 may include volatile memory (i.e., the value or state of the data is indeterminate if power is interrupted to system 600).

Peripheral interface 670 may include any hardware interface not specifically mentioned above. Peripherals refer generally to devices that connect dependently to system 600. A dependent connection is one where system 600 provides the software and/or hardware platform on which operation executes, and with which a user interacts.

Figure 8:
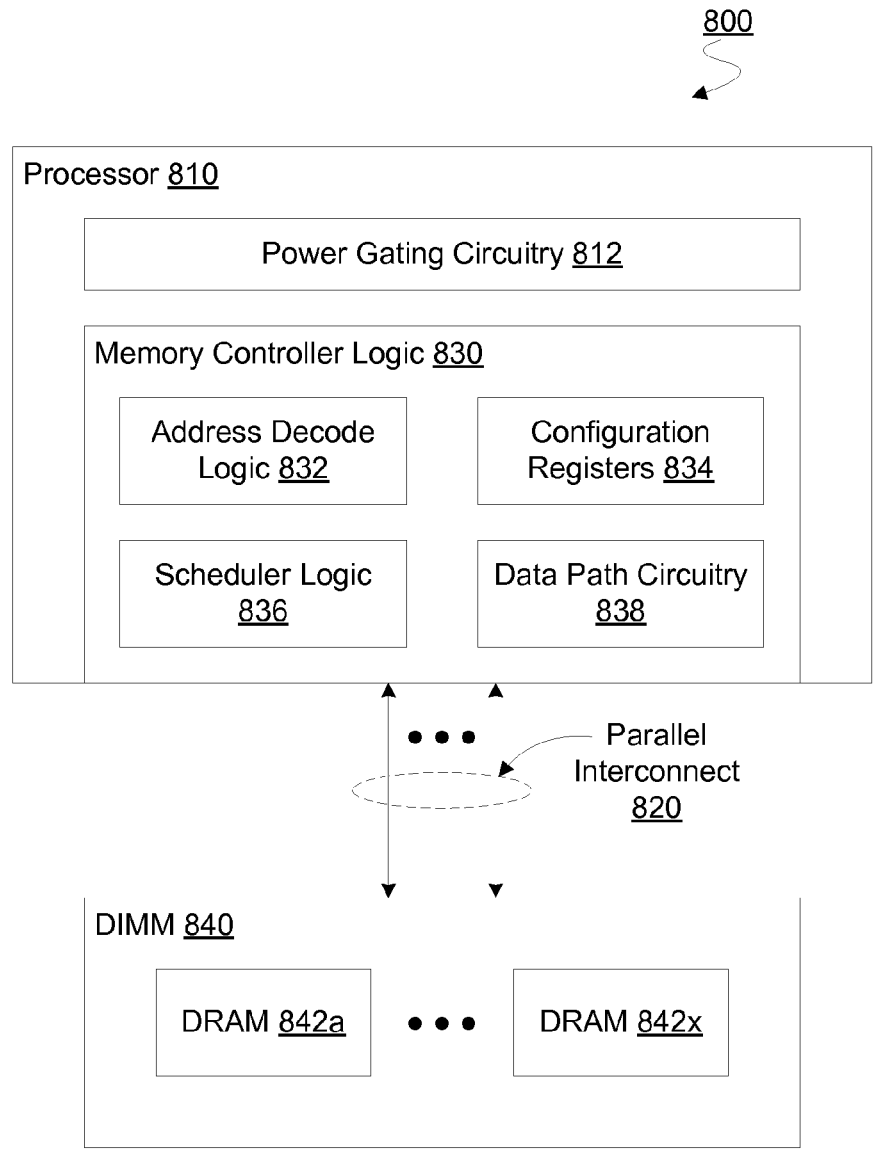
FIG. 8 is a block diagram illustrating elements of a computing system for gating power for an I/O interface according to an embodiment.

FIG. 8 shows elements of an illustrative computer system 800 for providing power management according to an embodiment. Computer system 800 may include some or all of the features of computer system 100, for example. In an embodiment, computer system 800 includes a processor 810 and a memory device—e.g. the illustrative dual in-line memory module (DIMM) 840—which is coupled thereto via a parallel interconnect 820.

Processor 810 may include a central processing unit (CPU), a security processor, a graphics processor, a co-processor, or the like. Processor 810 is an example of one type of device which may include a parallel I/O interface for which power gating is provided according to an embodiment. By way of illustration and not limitation, processor 810 may include memory controller logic 830 to couple to parallel interconnect 820—e.g. where memory controller logic 830 provides various mechanisms for controlling operation of DIMM 840. Memory controller logic 830 may include some or all of the features of I/O interface 105, for example.

In an embodiment, memory controller logic 830 operates for processor 810 to variously read data from and/or write data to DRAM devices 842a, . . . , 842x of DIMM 840. Memory controller logic 830 may implement any of a variety of additional or alternative I/O interface functionality, according to different embodiments. DIMM 840 is an example of one type of device which may participate in communications with another device's parallel I/O interface, for which power gating is provided according to an embodiment.

In an embodiment, memory controller logic supports a plurality of links each for communicating via interconnect 820—e.g. where at least one such link is a variable-width link. Processor 810 may include or couple to logic—e.g. the illustrative power gating circuitry 812—to provide fine-grain power gating for memory controller logic 830 which is selective on a link-specific basis. Such power gating may, for example, exploit brief idle intervals to save DDR leakage, in addition to occasionally switching power across all links.

For example, during a self-refresh (SR) cycle for some or all of DIMM 840, a significant portion of memory controller logic 830 may be powered down. There may be a few critical architectural states/logic distributed within memory controller logic 830 that need to be kept "alive" and cannot be powered down. Such states/logic may, for example, include configuration registers 834 which are specific to a given link. Additionally or alternatively, memory controller logic 830 may include scheduler logic 836 and/or data path circuitry 838 which are specific to the given link. In an embodiment, scheduler logic 836 and data path circuitry 838 must both remained powered even when the specific link transitions to a state of having no currently active lanes. Alternatively or in addition, such states/logic may include logic that drives a clock enable (CKE) pin low to keep DIMM 840 in self-refresh, a state machine to maintain an indication that DIMM 840 is in self-refresh and/or to facilitate a proper self-refresh exit sequence, transaction queues and associated logic flags which identify if queues are empty, and/or the like.

In an embodiment, memory controller logic 830 includes other logic, specific to a given link of a plurality of links, which may be selectively power gated—e.g. in response to a change in a number of active lanes of the given link. For example, memory controller logic 830 may further include, for example, address decode logic 832 which is dedicated to performing address decode operations for a specific link. In an embodiment, address decode logic 832 may be switchedly decoupled from any/all power in response to the specific link transitioning to a state of having no currently active lanes. Any of a variety of additional or alternative components (not shown) of memory controller logic 830 may be selectively power gated by power gating circuitry, according to different embodiments.

Figure 7:
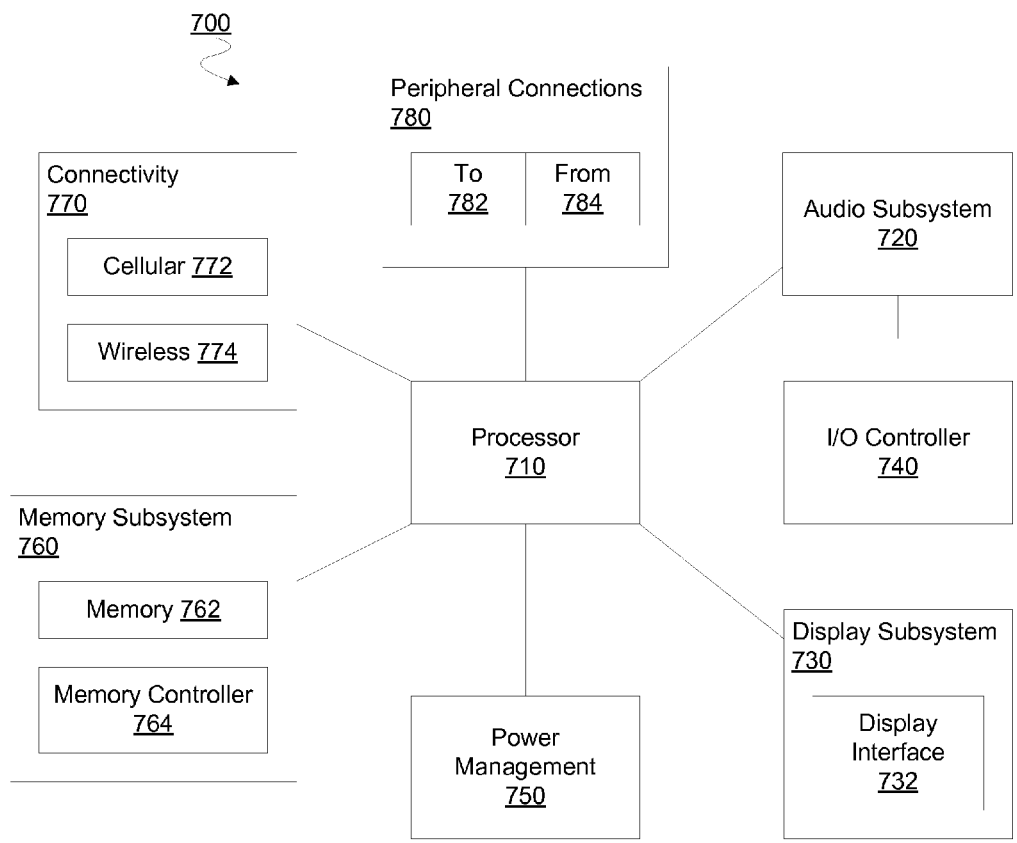
FIG. 7 is a block diagram illustrating elements of a mobile device for gating power for an I/O interface according to an embodiment.

FIG. 7 is a block diagram of an embodiment of a mobile device in which power gating may be implemented. Device 700 represents a mobile computing device, such as a computing tablet, a mobile phone or smartphone, a wireless-enabled e-reader, or other mobile device. It will be understood that certain of the components are shown generally, and not all components of such a device are shown in device 700.

Device 700 may include processor 710, which performs the primary processing operations of device 700. Processor 710 may include one or more physical devices, such as microprocessors, application processors, microcontrollers, programmable logic devices, or other processing means. In one embodiment, processor 710 includes optical interface components in addition to a processor die. Thus, the processor die and photonic components are in the same package. Such a processor package may interface optically with an optical connector in accordance with any embodiment described herein.

The processing operations performed by processor 710 include the execution of an operating platform or operating system on which applications and/or device functions are executed. The processing operations include operations related to I/O (input/output) with a human user or with other devices, operations related to power management, and/or operations related to connecting device 700 to another device. The processing operations may also include operations related to audio I/O and/or display I/O.

In one embodiment, device 700 includes audio subsystem 720, which represents hardware (e.g., audio hardware and audio circuits) and software (e.g., drivers, codecs) components associated with providing audio functions to the computing device. Audio functions may include speaker and/or headphone output, as well as microphone input. Devices for such functions may be integrated into device 700, or connected to device 700. In one embodiment, a user interacts with device 700 by providing audio commands that are received and processed by processor 710.

Display subsystem 730 represents hardware (e.g., display devices) and software (e.g., drivers) components that provide a visual and/or tactile display for a user to interact with the computing device. Display subsystem 730 may include display interface 732, which may include the particular screen or hardware device used to provide a display to a user. In one embodiment, display interface 732 includes logic separate from processor 710 to perform at least some processing related to the display. In one embodiment, display subsystem 730 includes a touchscreen device that provides both output and input to a user.

I/O controller 740 represents hardware devices and software components related to interaction with a user. I/O controller 740 may operate to manage hardware that is part of audio subsystem 720 and/or display subsystem 730. Additionally, I/O controller 740 illustrates a connection point for additional devices that connect to device 700 through which a user might interact with the system. For example, devices that may be attached to device 700 might include microphone devices, speaker or stereo systems, video systems or other display device, keyboard or keypad devices, or other I/O devices for use with specific applications such as card readers or other devices.

As mentioned above, I/O controller 740 may interact with audio subsystem 720 and/or display subsystem 730. For example, input through a microphone or other audio device may provide input or commands for one or more applications or functions of device 700. Additionally, audio output may be provided instead of or in addition to display output. In another example, if display subsystem includes a touchscreen, the display device also acts as an input device, which may be at least partially managed by I/O controller 740. There may also be additional buttons or switches on device 700 to provide I/O functions managed by I/O controller 740.

In one embodiment, I/O controller 740 manages devices such as accelerometers, cameras, light sensors or other environmental sensors, gyroscopes, global positioning system (GPS), or other hardware that may be included in device 700. The input may be part of direct user interaction, as well as providing environmental input to the system to influence its operations (such as filtering for noise, adjusting displays for brightness detection, applying a flash for a camera, or other features).

In one embodiment, device 700 includes power management 750 that manages battery power usage, charging of the battery, and features related to power saving operation. Memory subsystem 760 may include memory device(s) 762 for storing information in device 700. Memory subsystem 760 may include nonvolatile (state does not change if power to the memory device is interrupted) and/or volatile (state is indeterminate if power to the memory device is interrupted) memory devices. Memory subsystem 760 may store application data, user data, music, photos, documents, or other data, as well as system data (whether long-term or temporary) related to the execution of the applications and functions of system 700. In one embodiment, memory subsystem 760 includes memory controller 764 (which could also be considered part of the control of system 700, and could potentially be considered part of processor 710). In an embodiment, memory controller 764 issues commands to access memory 762.

Connectivity 770 may include hardware devices (e.g., wireless and/or wired connectors and communication hardware) and software components (e.g., drivers, protocol stacks) to enable device 700 to communicate with external devices. The device could be separate devices, such as other computing devices, wireless access points or base stations, as well as peripherals such as headsets, printers, or other devices.

Connectivity 770 may include multiple different types of connectivity. To generalize, device 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 774 refers to wireless connectivity that is not cellular, and may include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 780 include hardware interfaces and connectors, as well as software components (e.g., drivers, protocol stacks) to make peripheral connections. It will be understood that device 700 could both be a peripheral device ("to" 782) to other computing devices, as well as have peripheral devices ("from" 784) connected to it. Device 700 commonly has a "docking" connector to connect to other computing devices for purposes such as managing (e.g., downloading and/or uploading, changing, synchronizing) content on device 700. Additionally, a docking connector may allow device 700 to connect to certain peripherals that allow device 700 to control content output, for example, to audiovisual or other systems.

In addition to a proprietary docking connector or other proprietary connection hardware, device 700 may make peripheral connections 780 via common or standards-based connectors. Common types may include a Universal Serial Bus (USB) connector (which may include any of a number of different hardware interfaces), DisplayPort including MiniDisplayPort (MDP), High Definition Multimedia Interface (HDMI), Firewire, or other type.

In one aspect, an apparatus comprises power gate logic to couple to control logic, wherein the control logic monitors a first link of a plurality of links, wherein a serial input/output (I/O) interface includes resources comprising a first set of resources which is to support communication only via the first link, the power gate logic to decouple a resource of the first set of resources from a respective power supply in response to detection by the control logic of a change of a total number of active lanes of the first link.

In an embodiment, the plurality of links further includes a second link, wherein the resources further comprise a second set of resources which is to support communication only via the second link, wherein the power gate logic is to decouple the resource of the first set of resources from the respective power supply independent of any a resource of the second set of resources being decoupled from a respective power supply. In an embodiment, the power gate logic is to decouple the resource of the first set of resources from the respective power supply in response to detection by the control logic that no lanes of the first link are active. In an embodiment, the power gate logic is to decouple the resource of the first set of resources from the respective power supply independent of any other resource of the first set of resources being decoupled from a respective power supply.

In an embodiment, the other resource of the first set of resources maintains state information for the link. In an embodiment, wherein the control logic is further to monitor the plurality of links after the resource of the first set of resources is decoupled from the respective power supply and while the other resource of the first set of resources is powered. In an embodiment, the I/O interface is for communication compatible with a Peripheral Component Interconnect (PCI) communication standard. In an embodiment, the I/O interface is for communication between a first processor and a second processor.

In another aspect, a system comprises an input/output (I/O) interface including resources comprising a first set of resources to support communication only via a first link of a plurality of links. The system further includes a power delivery unit comprising control logic to monitor the first link, wherein the control logic to detect a change of a total number of active lanes of the first link. The power delivery unit further comprises power gate logic coupled to the control logic, the power gate logic to decouple a resource of the first set of resources from a respective power supply in response to the change of the total number of active lanes of the first link.

In an embodiment, the plurality of links further includes a second link, wherein the resources further comprise a second set of resources which is to support communication only via the second link, wherein the power gate logic is to decouple the resource of the first set of resources from the respective power supply independent of any a resource of the second set of resources being decoupled from a respective power supply. In an embodiment, the power gate logic is to decouple the resource of the first set of resources from the respective power supply in response to detection by the control logic that no lanes of the first link are active. In an embodiment, the power gate logic is to decouple the resource of the first set of resources from the respective power supply independent of any other resource of the first set of resources being decoupled from a respective power supply.

In an embodiment, the other resource of the first set of resources maintains state information for the link. In an embodiment, the control logic is further to monitor the plurality of links after the resource of the first set of resources is decoupled from the respective power supply and while the other resource of the first set of resources is powered. In an embodiment, the I/O interface is for communication compatible with a Peripheral Component Interconnect (PCI) communication standard. In an embodiment, the I/O interface is for communication between a first processor and a second processor.

In another aspect, a method comprises monitoring a first link of a plurality of links, wherein an input/output (I/O) interface includes resources comprising a first set of resources which is to support communication only via the first link, and based on the monitoring, detecting a change of a total number of active lanes of the first link. The method further comprises, in response to detecting the change of the total number of active lanes of the first link, decoupling a resource of the first set of resources from a respective power supply. In an embodiment, the plurality of links further includes a second link, wherein the resources further comprise a second set of resources which is to support communication only via the second link, wherein the decoupling the resource of the first set of resources from the respective power supply is independent of any decoupling of a resource of the second set of resources from a respective power supply. In an embodiment, the decoupling the resource of the first set of resources from the respective power supply is in response to detecting that no lanes of the first link are active. In an embodiment, the decoupling the resource of the first set of resources from the respective power supply is independent of any decoupling of another resource of the first set of resources from a respective power supply. In an embodiment, the other resource of the first set of resources maintains state information for the link. In an embodiment, the I/O interface is for communication compatible with a Peripheral Component Interconnect (PCI) communication standard. In an embodiment, the I/O interface is for communication between a first processor and a second processor.

In another aspect, a computer-readable storage medium has stored thereon instructions which, when executed by one or more processing units, cause the one or more processing units to perform a method. The method comprises monitoring a first link of a plurality of links, wherein an input/output (I/O) interface includes resources comprising a first set of resources which is to support communication only via the first link, and based on the monitoring, detecting a change of a total number of active lanes of the first link. The method further comprises, in response to detecting the change of the total number of active lanes of the first link, decoupling a resource of the first set of resources from a respective power supply.

In an embodiment, the plurality of links further includes a second link, wherein the resources further comprise a second set of resources which is to support communication only via the second link, wherein the decoupling the resource of the first set of resources from the respective power supply is independent of any decoupling of a resource of the second set of resources from a respective power supply. In an embodiment, the decoupling the resource of the first set of resources from the respective power supply is in response to detecting that no lanes of the first link are active.

In an embodiment, the decoupling the resource of the first set of resources from the respective power supply is independent of any decoupling of another resource of the first set of resources from a respective power supply. In an embodiment, the other resource of the first set of resources maintains state information for the link. In an embodiment, the I/O interface is for communication compatible with a Peripheral Component Interconnect (PCI) communication standard. In an embodiment, the I/O interface is for communication between a first processor and a second processor.

Techniques and architectures for managing power delivery are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
power gate logic to couple to control logic, wherein the control logic monitors a first link of a plurality of links, wherein a serial input/output (I/O) interface includes a protocol stack comprising a physical layer and a link layer, wherein resources of the serial I/O interface comprise a first set of resources which, of the plurality of links, is to support communication only via the first link, the power gate logic configured to decouple a link layer resource of the first set of resources from a respective power supply in response to detection by the control logic of a change of a total number of active lanes of the first link, wherein the power gate logic to decouple the link layer resource of the first set of resources from the respective power supply independent of whether another link layer resource of the first set of resources is decoupled from a respective power supply.

2. The apparatus of claim 1, wherein the plurality of links further includes a second link, wherein the resources of the serial I/O interface further comprise a second set of resources which is to support communication only via the second link, wherein the power gate logic to decouple the link layer resource of the first set of resources from the respective power supply independent of whether any resource of the second set of resources is decoupled from a respective power supply.

3. The apparatus of claim 1, wherein the power gate logic to decouple the link layer resource of the first set of resources from the respective power supply in response to detection by the control logic that no lanes of the first link are active.

4. The apparatus of claim 1, wherein the other link layer resource of the first set of resources maintains state information for the link.

5. The apparatus of claim 4, wherein the control logic further monitors the plurality of links after the link layer resource of the first set of resources is decoupled from the respective power supply and while the other link layer resource of the first set of resources is powered.

6. The apparatus of claim 1, wherein the serial I/O interface is for communication compatible with a Peripheral Component Interconnect (PCI) communication standard.

7. The apparatus of claim 1, wherein the serial I/O interface is for communication between a first processor and a second processor.

8. A system comprising:
an input/output (I/O) interface including a protocol stack comprising a physical layer and a link layer, wherein resources of the I/O interface comprise a first set of resources to support communication only via a first link of a plurality of links; and
a power delivery unit comprising:
control logic to monitor the first link, wherein the control logic to detect a change of a total number of active lanes of the first link; and
power gate logic coupled to the control logic, the power gate logic configured to decouple a link layer resource of the first set of resources from a respective power supply in response to the change of the total number of active lanes of the first link, wherein the power gate logic to decouple the link layer resource of the first set of resources from the respective power supply independent of whether another link layer resource of the first set of resources is decoupled from a respective power supply.

9. The system of claim 8, wherein the plurality of links further includes a second link, wherein the resources of the serial I/O interface further comprise a second set of resources which is to support communication only via the second link, wherein the power gate logic to decouple the link layer resource of the first set of resources from the respective power supply independent of any resource of the second set of resources being decoupled from a respective power supply.

10. The system of claim 8, wherein the power gate logic to decouple the link layer resource of the first set of resources from the respective power supply in response to detection by the control logic that no lanes of the first link are active.

11. The system of claim 8, wherein the other link layer resource of the first set of resources maintains state information for the link.

12. The system of claim 11, wherein the control logic further to monitor the plurality of links after the link layer resource of the first set of resources is decoupled from the respective power supply and while the other link layer resource of the first set of resources is powered.

13. The system of claim 8, wherein the I/O interface is for communication compatible with a Peripheral Component Interconnect (PCI) communication standard.

14. The system of claim 8, wherein the I/O interface is for communication between a first processor and a second processor.

15. A method comprising:
monitoring a first link of a plurality of links, wherein an input/output (I/O) interface includes a protocol stack comprising a physical layer and a link layer, wherein resources of the serial I/O interface comprise a first set of resources which, of the plurality of links, is to support communication only via the first link;
based on the monitoring, detecting a change of a total number of active lanes of the first link; and
in response to detecting the change of the total number of active lanes of the first link, decoupling a resource of the first set of resources from a respective power supply independent of whether another link layer resource of the first set of resources is decoupled from a respective power supply.

16. The method of claim 15, wherein the plurality of links further includes a second link, wherein the resources of the serial I/O interface further comprise a second set of resources which is to support communication only via the second link, wherein the decoupling the link layer resource of the first set of resources from the respective power supply is independent of any decoupling of a resource of the second set of resources from a respective power supply.

17. The method of claim 15, wherein the decoupling the link layer resource of the first set of resources from the respective power supply is in response to detecting that no lanes of the first link are active.

18. The method of claim 15, wherein the other link layer resource of the first set of resources maintains state information for the link.

19. The method of claim 15, wherein the I/O interface is for communication compatible with a Peripheral Component Interconnect (PCI) communication standard.

20. The method of claim 15, wherein the I/O interface is for communication between a first processor and a second processor.

21. A non-transitory computer-readable storage medium having stored thereon instructions which, when executed by one or more processing units, cause the one or more processing units to perform a method comprising:
monitoring a first link of a plurality of links, wherein an input/output (I/O) interface includes a protocol stack comprising a physical layer and a link layer, wherein resources of the serial I/O interface comprise a first set of resources which, of the plurality of links, is to support communication only via the first link;
based on the monitoring, detecting a change of a total number of active lanes of the first link; and
in response to detecting the change of the total number of active lanes of the first link, decoupling a resource of the first set of resources from a respective power supply independent of whether another link layer resource of the first set of resources is decoupled from a respective power supply.

22. The non-transitory computer-readable storage medium of claim 21, wherein the plurality of links further includes a second link, wherein the resources of the serial I/O interface further comprise a second set of resources which is to support communication only via the second link, wherein the decoupling the link layer resource of the first set of resources from the respective power supply is independent of any decoupling of a resource of the second set of resources from a respective power supply.

23. The non-transitory computer-readable storage medium of claim 21, wherein the decoupling the link layer resource of the first set of resources from the respective power supply is in response to detecting that no lanes of the first link are active.

24. The non-transitory computer-readable storage medium of claim 21, wherein the other link layer resource of the first set of resources maintains state information for the link.

25. The non-transitory computer-readable storage medium of claim 21, wherein the I/O interface is for communication compatible with a Peripheral Component Interconnect (PCI) communication standard.

26. The non-transitory computer-readable storage medium of claim 21, wherein the I/O interface is for communication between a first processor and a second processor.

* * * * *